(No Model.)

H. J. STEINER.
ANIMAL TRAP.

No. 477,966. Patented June 28, 1892.

WITNESSES:

INVENTOR

BY

ATTORNEYS.

UNITED STATES PATENT OFFICE.

HENRY J. STEINER, OF JERSEY CITY, NEW JERSEY.

ANIMAL-TRAP.

SPECIFICATION forming part of Letters Patent No. 477,966, dated June 28, 1892.

Application filed April 11, 1892. Serial No. 428,659. (No model.)

*To all whom it may concern:*

Be it known that I, HENRY J. STEINER, of Jersey City, in the county of Hudson and State of New Jersey, have invented a new and Improved Trap, of which the following is a full, clear, and exact description.

My invention relates to an improvement in traps, and has for its object to provide an article of this character which will be exceedingly simple, durable, and economic, and adapted when sprung to strike the animal upon the neck or across the back, and in this manner to hold it a prisoner; but the prime object of the invention is to provide a means whereby the trap may be set from the exterior, it not being necessary for the manipulator to pass the hand in any way into the interior of the trap, and by this means all danger of injury to the operator while setting the trap in position to be sprung is effectually avoided.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
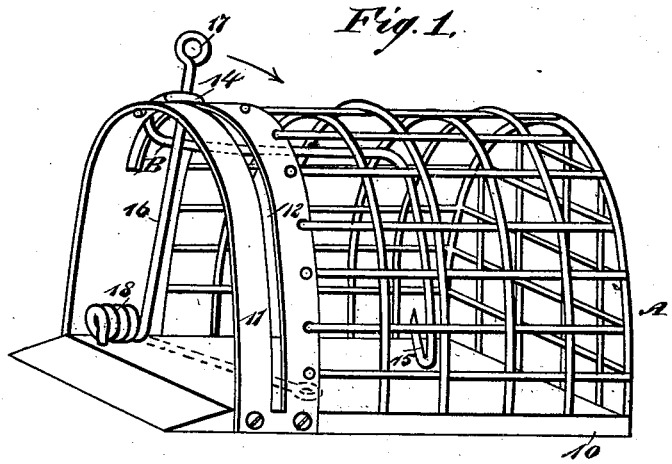
Figure 2:
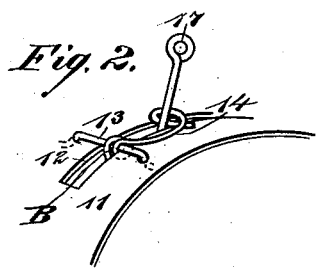
Figure 3:
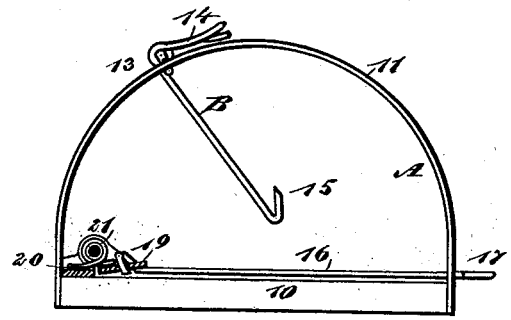

Figure 1 is a perspective view of the trap. Fig. 2 is a perspective view of that portion of the trap at which the bait or trip lever is located, the latter being illustrated as securing the execution-arm in position to be tripped; and Fig. 3 is an end view of the trap, illustrating a slight modification in the manner of attaching the execution-arm to the body of the trap, and also showing the arm in its lower position or the position it occupies after being released from the bait or trip lever.

The body of the trap A may be of any suitable or desired construction. Preferably, however, it is made somewhat arch-shaped or semicircular, as shown in Fig. 1, the body being secured in any suitable or approved manner to a base 10. Ordinarily the major portion of the body is constructed of interwoven bars or strands of wire, in order that the interior may be rendered visible from the outer side of the trap; but at least one end of the body is preferably formed from a strip of metal 11, which strip is provided with a longitudinal slot 12, extending from the base 10 at one side of the plate and terminating between the top and the lower end at the opposite side of the body, as is best shown in Fig. 1; but if in practice it is found advantageous the entire body portion of the trap may be made from twisted or woven wire, the wire being so manipulated as to provide the said slot 12.

The bait-lever B acts, also, in the capacity of a trip-lever, and this lever is of angular formation, being preferably fulcrumed near its upper end upon a bar 13, crossing the rear or upper portion of the slot 12, as shown in Fig. 2, or the trigger may be pivoted in any other approved manner. The formation of the trigger is preferably that shown in the drawings, which consists of a horizontal head 14, located outside of the trap-body and in such a position that it may extend over the slot 12 within the body of the trap proper some distance backward and thence vertically downward, or essentially so, the lower end of the lever being provided with a hook 15 or the equivalent thereof adapted to receive the bait.

What I term the "execution-arm" of the trap is a straight arm 16, controlled at its lower end by a spring, the arm being either directly or indirectly attached either to the bottom of the body or to the base opposite the longer arm of the slot 12. The execution-arm 16 extends upward through the slot 12 and at its upper end is ordinarily provided with a handle 17.

In Fig. 1 a simple manner of controlling the exoution-arm by a spring is illustrated, and simply consists in causing the arm to form one end of a coiled spring 18, the other end of this spring being secured in the base, and the said spring is so wound that it exerts a downward tension upon the arm 16, and when said arm is not held in a vertical position the spring will force it violently down to a horizontal position and hold it there.

In Fig. 3 the arm is attached to a plate 19, which plate is attached to a second plate 20, the latter being attached to the base of the trap. The first plate or that carrying the arm 16 is controlled by a spring 21, the spring exerting tension upon the plate and therefore upon the arm in the same direction as described in connection with the spring 18, above mentioned.

In the operation of setting the trap it is not necessary to place the hands in the interior thereof, as the trap is not set until the bait has been secured upon the lower end of the lever 15. This having been accomplished, the arm 16 is drawn upward in the slot 12, the operator grasping the outer end of the arm, and when the arm has been carried practically to a vertical position, as shown in Figs. 1 and 2, the head of the trip or bait lever is made to so engage with the arm as to hold it in its vertical position.

When an animal enters the trap and attempts to remove the bait or to nibble at it, the slightest touch made by the animal upon the lower end of the bait or trip lever will disengage the head of the lever from the arm 16, and said arm will be instantly and with great rapidity forced down to a horizontal position and will strike the back or the neck of the animal before the latter can escape from the trap and will hold it a prisoner.

It is obvious that in setting this trap no danger is incurred by the operator, and this is the main feature of the invention, as everything in the way of setting it may be accomplished from the exterior of the trap in not only a simple but in an exceedingly expeditious manner.

Having thus described my invention, I claim as new and desire to secure by Letters Patent—

1. The herein-described trap, comprising a body or cage having an opening for the animal, a spring-actuated executing-arm secured to the body at one end and adapted to move across the body at right angles to its opening and strike the animal across the back or neck, the upper or outer end of the said arm being external to the body or cage, and a trigger-lever pivoted to the body or cage and having one end provided with a detent or head to engage the free end of the lever and hold it retracted and the opposite end of the lever being adapted to hold the bait in front of the path crossed by the executing-arm, substantially as set forth.

2. In a trap, the combination, with the body thereof, the said body being provided with a slot extending upward from its base, of a combined trip and bait lever fulcrumed upon the body, the said lever being provided with a head which extends over the outer portion of the body adjacent to the body-slot, and an arm of execution, spring-controlled and connected with the body opposite the lower portion of the body-slot, which arm extends outward through the body-slot and is adapted to be engaged by the head of the combined trip and bait lever, whereby the trap may be set entirely from the exterior, and when the arm of execution is released it will be instantly and automatically forced downward over the body of the animal disturbing the bait or trip lever, as and for the purpose set forth.

HENRY J. STEINER.

Witnesses:
AUG. HERMAN MÜLLER,
ROBERT D. P. MOUNT.